United States Patent
Teramoto

(10) Patent No.: US 8,431,287 B2
(45) Date of Patent: Apr. 30, 2013

(54) LITHIUM ION CONDUCTIVE SOLID ELECTROLYTE AND METHOD FOR PRODUCING THE SAME

(75) Inventor: Jun Teramoto, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 1075 days.

(21) Appl. No.: 12/235,177

(22) Filed: Sep. 22, 2008

(65) Prior Publication Data

US 2009/0081555 A1  Mar. 26, 2009

(30) Foreign Application Priority Data

Sep. 25, 2007 (JP) ................. 2007-247904

(51) Int. Cl.
*H01M 8/10* (2006.01)
*C04B 35/64* (2006.01)

(52) U.S. Cl.
USPC ........... 429/495; 429/422; 429/509; 429/532; 264/681

(58) Field of Classification Search .............. 429/422, 429/495.509, 532; 264/681
See application file for complete search history.

(56) References Cited

U.S. PATENT DOCUMENTS

| | | | |
|---|---|---|---|
| 5,620,637 A * | 4/1997 | Kaga et al. ............. | 264/681 |
| 6,001,761 A | 12/1999 | Hata et al. | |
| 2007/0087269 A1 | 4/2007 | Inda | |

FOREIGN PATENT DOCUMENTS

| | | |
|---|---|---|
| JP | 06009268 A | 1/1994 |
| JP | 08151270 A | 6/1996 |
| JP | 2007134305 A | 5/2007 |

* cited by examiner

*Primary Examiner* — Patrick Ryan
*Assistant Examiner* — Alex Usyatinsky
(74) *Attorney, Agent, or Firm* — Westerman, Hattori, Daniels & Adrian, LLP

(57) ABSTRACT

In a solid electrolyte obtained by sintering a powder, high ionic conductivity and remarkably low moisture permeation applicable to a lithium ion secondary battery or a lithium primary battery are realized. A method for producing a solid electrolyte including the steps of preparing a green sheet containing a lithium ion conductive inorganic material powder; and firing the green sheet, wherein in the step of firing the green sheet, at least one surface of the green sheet is covered by a setter having a porosity of not more than 10% by volume, is disclosed.

10 Claims, No Drawings

LITHIUM ION CONDUCTIVE SOLID ELECTROLYTE AND METHOD FOR PRODUCING THE SAME

CROSS REFERENCES TO RELATED APPLICATIONS

The present invention contains subject matter related to Japanese Patent Application No. 2007-247904 filed with the Japan Patent Office on Sep. 25, 2007, the entire contents of which being incorporated herein by reference.

BACKGROUND OF THE INVENTION

1. Field of the Invention

The present invention relates to a lithium ion conductive solid electrolyte. In particular, the invention relates to a solid electrolyte which is suitable for a wholly solid lithium primary battery or a wholly solid lithium ion secondary battery, a lithium primary battery and a lithium ion secondary battery.

2. Description of the Related Art

In recent years, a lithium ion battery is widely utilized as an electric power source of portable information devices such as cellular phones or laptop personal computers. The battery to be used for the foregoing applications is demanded to have high safety and simultaneously required to have a high energy density and excellent cycle properties.

In order to cope with these demands, as to an electrolyte material, a gel polymer electrolyte having a polymer impregnated with an electrolytic liquid from an organic electrolytic liquid gets attention. A gel polymer battery utilizing a gel polymer electrolyte uses an electrolyte in a gel form prepared by impregnating an electrolytic liquid as a liquid in a polymer and involves advantages such that liquid leakage hardly occurs; that safety of the battery is enhanced; and that a degree of shape freedom is high. However, since this gel polymer electrolyte still uses an organic electrolytic liquid, it cannot be said that the risk is completely excluded, and there is involved a possibility of ignition or the like. Accordingly, in order to achieve higher safety, a battery which does not use an organic electrolytic liquid at all is desirable.

Then, as a material which has safety and which is low in a load to the environment, there have been made a number of attempts to use an inorganic solid electrolyte. A solid electrolyte obtained by sintering a powder is proposed for the reasons that it has a high degree of freedom for forming and is advantageous from the standpoint of costs.

However, the solid electrolyte obtained by sintering a powder contains a number of pores, and when it is used as a separator in a lithium metal-air primary battery composed of a lithium metal electrode and an air electrode, the moisture formed in the air electrode passes through the pores existing in the solid electrolyte and reaches the side of the lithium electrode, thereby possibly causing ignition. For that reason, in the lithium metal-air primary battery, a solid electrolyte which is minute and remarkably low in moisture permeation is required. However, a solid electrolyte which is sufficiently low in moisture permeation has not been obtained yet.

Also, in the solid electrolyte obtained by sintering a powder, the pores hinder the conduction of a lithium ion so that it was difficult to attain high lithium ion conductivity. In this point, there is problem as a solid electrolyte for an application to a lithium ion secondary battery or a lithium primary battery.

SUMMARY OF THE INVENTION

In a solid electrolyte obtained by sintering a powder, a problem of the invention is to realize high ionic conductivity and remarkably low moisture permeation applicable to a lithium ion secondary battery or a lithium primary battery.

The present inventor made extensive and intensive investigations regarding an inorganic solid electrolyte obtained by firing a green sheet using a lithium ion conductive inorganic material powder. As a result, he has found that by covering at least one surface of the green sheet by a setter having a porosity of not more than 10% by volume and firing it, a solid electrolyte which has a total area of pores penetrating in a thickness direction of the solid electrolyte of not more than a fixed value, has high ionic conductivity and is minute and remarkably low in moisture permeation is obtainable. Furthermore, he has found a production method for regulating the porosity in the solid electrolyte at not more than a fixed value.

Also, he has found that a battery obtained by disposing a positive electrode and a negative electrode, respectively on the both surfaces of the solid electrolyte obtained by this production method is high in output and capacity, good in charge-discharge cycle properties and high in safety as compared with existing solid electrolytes having a high surface porosity, leading to accomplishment of the invention.

Specifically, the invention provides the following.

(1) A method for producing a solid electrolyte comprising the steps of preparing a green sheet containing a lithium ion conductive inorganic material powder; and firing the green sheet, wherein in the step of baking the green sheet, at least one surface of the green sheet is covered by a setter having a porosity of not more than 10% by volume.

(2) The method for producing a solid electrolyte as set forth above in (1), wherein the setter is any one of glass, a glass ceramic or a ceramic.

(3) The method for producing a solid electrolyte as set forth above in (1) or (2), wherein the setter has a maximum through-pore size of not more than 6 μm.

(4) The method for producing a solid electrolyte as set forth above in any one of (1) to (3), wherein the step of firing the green sheet includes a degreasing step and a sintering step, and a sintering temperature in the sintering step is from 750 to 1,250° C.

(5) The method for producing a solid electrolyte as set forth above in any one of (1) to (4), wherein the step of baking the green sheet includes a degreasing step, and a degreasing temperature in the degreasing step is from 300 to 700° C.

(6) The method for producing a solid electrolyte as set forth above in any one of (1) to (5), wherein the step of preparing a green sheet includes a step of mixing a lithium ion conductive inorganic material powder and an organic binder.

(7) The method for producing a solid electrolyte as set forth above in (6), wherein in the step of mixing a lithium ion conductive inorganic material powder and an organic binder, the content of the lithium ion conductive inorganic material powder is 50% by weight or more.

(8) The method for producing a solid electrolyte as set forth above in (6) or (7), wherein in the step of mixing a lithium ion conductive inorganic material powder and an organic binder, the lithium ion conductive inorganic material powder has an average particle size of not more than 5 μm.

(9) The method for producing a solid electrolyte as set forth above in any one of (1) to (8), wherein the lithium ion conductive inorganic material powder contains a crystal of $Li_{1+x+z}M_x(Ge_{1-y}Ti_y)_{2-x}Si_zP_{3-z}O_{12}$, wherein $0 \leq x \leq 0.8$, $0 \leq y \leq 1.0$, $0 \leq z \leq 0.6$, and M is one or more member selected from Al and Ga.

(10) The method for producing a solid electrolyte as set forth above in any one of (1) to (9), wherein the lithium ion conductive inorganic material powder contains respective components of from 10 to 25% of $Li_2O$ and from 0.5 to 15% of $Al_2O_3$ and/or $Ga_2O_3$ and from 25 to 50% of $TiO_2$ and/or $GeO_2$ and from 0 to 15% of $SiO_2$ and from 26 to 40% of $P_2O_5$ in terms of % by mole on the oxide basis.

(11) The method for producing a solid electrolyte as set forth above in any one of (1) to (10), wherein the lithium ion conductive inorganic material powder is glass or a glass ceramic.

(12) A solid electrolyte which is obtained by firing a green sheet containing a lithium ion conductive inorganic material powder and has a porosity of not more than 5% by volume and a maximum through-pore size in a thickness direction of not more than 8 μm.

(13) The solid electrolyte as set forth above in (12), wherein at least one surface of the green sheet is covered by a setter having a porosity of not more than 10% by volume.

(14) The solid electrolyte as set forth above in (12) or (13), wherein the setter has a maximum through-pore size of not more than 6 μm.

(15) The solid electrolyte as set forth above in any one of (12) to (14), which has a maximum through-pore size in a thickness direction of not more than 8 μm and an average pore size of not more than 5 μm.

(16) The solid electrolyte as set forth above in any one of (12) to (15), which has an ionic conductivity of $1 \times 10^{-4}$ $Scm^{-1}$ or more.

(17) The solid electrolyte as set forth above in any one of (12) to (16), which contains a crystal of $Li_{1+x+z}M_x(Ge_{1-y}Ti_y)_{2-x}Si_zP_{3-z}O_{12}$, wherein $0 \leq x \leq 0.8$, $0 \leq y \leq 1.0$, $0 \leq z \leq 0.6$, and M is one or more member selected from Al and Ga.

(18) The solid electrolyte as set forth above in any one of (12) to (17), wherein the lithium ion conductive inorganic material powder contains respective components of from 10 to 25% of $Li_2O$ and from 0.5 to 15% of $Al_2O_3$ and/or $Ga_2O_3$ and from 25 to 50% of $TiO_2$ and/or $GeO_2$ and from 0 to 15% of $SiO_2$ and from 26 to 40% of $P_2O_5$ in terms of % by mole on the oxide basis.

(19) The solid electrolyte as set forth above in any one of (12) to (18), wherein the solid electrolyte has a thickness of not more than 300 μm.

(20) The solid electrolyte as set forth above in any one of (12) to (19), which is constituted of only the lithium ion conductive inorganic material.

(21) A lithium primary battery comprising the solid electrolyte as set forth above in any one of (12) to (20).

(22) A lithium ion secondary battery comprising the solid electrolyte as set forth above in any one of (12) to (20).

According to the invention, in an electrochemical application such as a lithium ion secondary battery or a lithium primary battery, a solid electrolyte which is high in battery capacity and which is able to be used stably and safely over a long period of time and a method for producing the same can be obtained. Furthermore, a solid electrolyte which is high in a degree of freedom for forming, high in ionic conductivity in an application of a lithium primary battery such as a lithium metal-air primary battery, remarkably low in moisture permeation and safe and a method for producing the same can be obtained. Also, a solid electrolyte which is good in charge-discharge cycle properties in an application of a lithium secondary battery and a method for producing the same can be obtained. Moreover, a lithium primary battery and a lithium ion secondary battery, each of which is high in battery capacity and which is able to be used stably and safely over a long period of time can be obtained.

The solid electrolyte of the invention is able to obtain an ionic conductivity value of $1 \times 10^{-4}$ $Scm^{-1}$ or more. From the overall viewpoint, in a preferred embodiment, the solid electrolyte of the invention is able to obtain an ionic conductivity value of $3 \times 10^{-4}$ $Scm^{-1}$ or more; and in a more preferred embodiment, the solid electrolyte of the invention is able to obtain an ionic conductivity value of $4 \times 10^{-4}$ $Scm^{-1}$ or more.

DESCRIPTION OF THE PREFERRED EMBODIMENTS

The invention is hereunder described in detail. A method for producing a solid electrolyte according to the invention comprises the steps of preparing a green sheet containing a lithium ion conductive inorganic material powder; and firing the green sheet, wherein in the step of firing the green sheet, at least one surface of the green sheet is covered by a setter having a porosity of not more than 10% by volume.

In order to obtain a high degree of freedom regarding forming of a solid electrolyte, the method for producing a solid electrolyte according to the invention includes a step of preparing a green sheet containing a lithium ion conductive inorganic material powder and a step of baking the green sheet.

The "green sheet" as referred to herein means an unfired material of an inorganic material powder formed in a sheet form and refers to a material obtained by forming a mixed slurry of an inorganic material powder, an organic binder, a plasticizer, a solvent and the like in a sheet form by a doctor blade or calendaring method or the like. The green sheet before firing is flexible so that it can be cut in an arbitrary shape or stacked.

The components other than an inorganic material to be contained in the green sheet in firing a green sheet, such as an organic binder can be gasified and removed from the green sheet. According to the invention, in the step of firing the green sheet, by covering at least one surface of the green sheet by a setter having a porosity of not more than 10% by volume, a solid electrolyte which is minute and remarkably low in moisture permeation can be obtained. This is because by covering the green sheet by the setter, a major part of the organic binder and the like is discharged from a thickness portion (side surface) of the green sheet, whereas the amount of the organic binder and the like to be discharged from the surface of the green sheet covered by the setter is reduced, and the quantity of pores penetrating in a thickness direction, which appear in the green sheet following the discharge of the organic binder and the like, becomes small.

For the purpose of making it easy to obtain the solid electrolyte which is minute and remarkably low in moisture permeation, it is preferable that the porosity of the setter is small as far as possible. Specifically, the porosity of the setter is more preferably not more than 7% by volume, and most preferably not more than 3% by volume. For the purpose of making it easy to obtain the effects of the invention, it is preferable that the both surfaces of the green sheet are covered by a setter having a porosity falling within the foregoing range. By covering the both surfaces of the green sheet, a major part of the gas is discharged from the thickness portion of the green sheet, and the quantity of pores penetrating in a thickness direction of the green sheet is easy to become small.

The "porosity" as referred to herein means a proportion of pores to be contained per unit volume and is expressed by the following expression.

$$\text{Porosity (\%)} = \{(\text{True density}) - (\text{Bulk density})\}/(\text{True density}) \times 100$$

The "true density" as referred to herein means a density of a substance per se which can be measured by a known method such as the Archimedean method. On the other hand, the "bulk density" as referred to herein means a density obtained by dividing a weight of the material by an apparent volume and refers to a density including holes on the surface of the material and pores in the inside thereof. As to a measurement method, the bulk density can be determined by measuring a sample processed into a shape which is easily measured (for example, a square shape, a columnar shape) for weight and volume and calculating a ratio of the weight to the volume.

The setter is not particularly limited with respect to a material quality so far as it is made of a material having chemical stability against in a firing temperature region of the green sheet and capable of keeping its shape. Glass, a glass ceramic or a ceramic is preferable as the material of the setter because the foregoing properties are easily available, and a desired porosity is easily obtainable. Specific examples thereof include fused silica, zirconia and alumina.

In addition to the foregoing matter of porosity, it is preferable that the setter has a maximum through-pore size of not more than 6 μm. By making the setter have a maximum through-pore size of not more than 6 μm, an effect for making the number of pores penetrating in a thickness direction of the green sheet small is easily obtainable. For the purpose of making it easy to obtain this effect, the maximum through-pore size of the setter is more preferably not more than 3 μm, and most preferably not more than 1 μm. It is preferable that the maximum through-pore size of the setter is small as far as possible, and therefore, its lower limit value is not particularly limited.

The maximum through-pore size as referred to in this specification means a pore diameter expressed by the following expression 1, which is corresponding to a bubble point value $P_b$ as measured on the basis of JIS K 3832 "Testing method of bubble point of microfiltration membrane element and module" using water or ethanol as a testing liquid and air or nitrogen as a testing gas.

$$d = K4\gamma \cos\theta / P_b \quad \text{Expression 1}$$

In the expression 1, d represents a pore diameter; γ represents a surface tension; θ represents a contact angle of the testing liquid; $P_b$ represents a pressure (bubble point value); and K represents a capillary constant.

The average through-pore size as referred to herein is a value obtained by the following method.

First of all, a gas pressure is applied from one side of a sheet-shaped solid electrolyte in a dry state to increase the gas pressure, thereby determining a curve (dry flow rate curve) expressing the relation of a flow rate of the gas (dry flow rate $D_n$ (liter/min)) which passes through the sheet-shaped solid electrolyte at the time when the pressure is $P_n$.

Next, a testing liquid is absorbed on the sheet-shaped solid electrolyte; a contact interface with the testing liquid is then formed on one side of the sheet-shaped solid electrolyte; a gas pressure is applied from a back side thereof to increase the gas pressure, thereby determining a curve (wet flow rate curve) expressing the relation of a flow rate of the gas air (wet flow rate $W_n$ (liter/min)) which passes through the sheet-shaped solid electrolyte at the time when the pressure is $P_n$.

The thus determined wet flow rate curve and a curve of a flow rate of ½ of the dry flow rate curve are superimposed; and a pore size corresponding to the pressure $P_n$ of the point of intersection at that time is determined from the following expression 2, a value of which is designated as the average through-pore size.

The measurement condition of the average through-pore size other than that as described previously is in conformity with that in JIS K 3832.

$$d_n = K4\gamma \cos\theta / P_n \quad \text{Expression 2}$$

In the expression 1, $d_n$ represents a pore diameter; γ represents a surface tension; θ represents a contact angle of the testing liquid; $P_n$ represents a pressure; and K represents a capillary constant.

The foregoing maximum through-pore size and average through-pore size can be, for example, measured using a pore size meter, PSM165 (manufactured by Topas GmbH).

The method for producing a solid electrolyte according to the invention is hereunder described.

The solid electrolyte of the invention is produced by processing a green sheet in an arbitrary shape; preferably after applying a pressure, covering at least one surface of the green sheet by a setter having a porosity of not more than 10% by volume as described previously; and firing the green sheet to remove organic components of an organic binder. The green sheet is formed by first mixing a lithium ion conductive inorganic material powder and an organic binder and optionally, a dispersant, etc. using a solvent and forming the mixture in a sheet form by a doctor blade method, a calendar roll method or the like. Details are hereunder described.

(Lithium Ion Conductive Inorganic Material Powder)

As the lithium ion conductive inorganic material powder, a powder of a crystal of, for example, LiN, LISICON, $La_{0.55}Li_{0.35}TiO_3$, $LiTi_2P_3O_{12}$, $Li_{1+x+z}M_x(Ge_{1-y}Ti_y)_{2-x}Si_zP_{3-z}O_{12}$ (wherein $0 \leq x \leq 0.8$, $0 \leq y \leq 1.0$, $0 \leq z \leq 0.6$, and M is one or more member selected from Al and Ga), etc. or a powder of a glass ceramic obtained by depositing such a crystal is preferable from the standpoint of high lithium ion conductivity.

The "glass ceramic" as referred to herein means a material obtained by heat treating glass to deposit a crystal phase in a glass phase and refers to a material composed of an amorphous solid and a crystal. The glass ceramic is more preferable because it does not substantially contain a pore or a grain boundary hindering the ionic conduction and is high in ionic conductivity and excellent in chemical stability. The glass ceramic includes a material obtained by phase transition of all of the glass phase into a crystal phase, namely a material in which the amount of crystal (degree of crystallinity) is 100% by mass. These do not contain a pore among crystal grains or in the crystal. In particular, as to the ionic conduction, in case of a ceramic, the conductivity is a considerably low value as compared with that of the crystal grain itself due to the presence of a pore or a grain boundary. The glass ceramic is able to suppress a lowering of the conductivity between the grains by controlling a crystallization step and to keep the conductivity of the same degree as in the ionic conductivity of the crystal itself.

In particular, a powder of a glass ceramic obtained by depositing a crystal of $Li_{1+x+z}M_x(Ge_{1-y}Ti_y)_{2-x}Si_zP_{3-z}O_{12}$ (wherein $0 \leq x \leq 0.8$, $0 \leq y \leq 1.0$, $0 \leq z \leq 0.6$, and M is one or more member selected from Al and Ga) is the most preferable of the foregoing lithium ion conductive inorganic material powders because it has high lithium ion conductivity and is chemical stable.

The glass ceramic having the foregoing crystal, namely the glass ceramic in which a crystal of $Li_{1+x+z}M_x(Ge_{1-y}Ti_y)_{2-x}Si_zP_{3-z}O_{12}$ (wherein $0 \leq x \leq 0.8$, $0 \leq y \leq 1.0$, $0 \leq z \leq 0.6$, and M is one or more member selected from Al and Ga) is deposited as a crystal phase can be obtained by melting glass containing respective components of from 10 to 25% of $Li_2O$ and from 0.5 to 15% of $Al_2O_3$ and/or $Ga_2O_3$ and from 25 to 50% of $TiO_2$ and/or $GeO_2$ and from 0 to 15% of $SiO_2$ and from 26 to 40% of $P_2O_5$ in terms of % by mole on the oxide basis and quenching it to obtain glass; and subsequently heat treating this glass to deposit a crystal.

Also, the green sheet may be prepared by using the foregoing glass as the lithium ion conductive inorganic material powder. In that case, in the foregoing glass, the foregoing crystal is deposited at the time of firing the green glass, whereby high ionic conductivity is exhibited.

The lithium ion conductive inorganic material powder can be prepared by pulverizing the foregoing lithium ion conductive inorganic material by a ball mill, a jet mill or the like. For the purpose of increasing a packing, in mixing with the organic binder, an average particle size of the lithium ion conductive inorganic material powder is preferably not more than 5 μm, more preferably not more than 3 μm, and most preferably not more than 1 μm. Also, in order to achieve uniform dispersion, a lower limit value of the average particle size of the lithium ion conductive inorganic material powder is preferably 0.01 μm or more, more preferably 0.05 μm or more, and most preferably 0.1 μm or more.

The "average particle size" as referred to herein means a value of D50 (particle size of accumulation of 50%), and specifically, values measured by using, as a measuring device, a particle size distribution measuring device LS100Q or a submicron particle size analyzer N5, both of which are manufactured by Beckman Coulter, can be applied. The average particle size is a value expressed on the volume basis. The measuring device is used for purpose depending upon the particle size of a material to be measured. In the case where a maximum particle size of the material to be measured is less than 3 μm, the particle size is measured by using only a submicron particle size analyzer N5.

For the purpose of reducing voids after firing, a lower limit value of the content of the lithium ion conductive inorganic material powder in mixing with the organic binder is preferably 50% by weight or more, more preferably 55% by weight or more, and most preferably 60% by weight or more relative to the amount of the mixed slurry composed of an inorganic powder, an organic binder, a plasticizer, a solvent and the like. Also, for the purpose of keeping the sheet shape, an upper limit value of the content of the lithium ion conductive inorganic material powder is preferably not more than 97% by weight, more preferably not more than 95% by weight, and most preferably not more than 93% by weight relative to the amount of the mixed slurry.

(Organic Binder)

As the organic binder, general-purpose binders which are commercially available as a forming assistant for press forming, rubber press forming, extrusion forming or injection forming can be used. Specifically, acrylic resins, ethyl cellulose, polyvinyl butyral, methacrylic resins, urethane resins, butyl methacrylate, vinyl based copolymers and the like can be used. For the purpose of making it easy to keep the sheet shape, a lower limit value of the content of the organic binder is preferably 3% by weight or more, more preferably 5% by weight or more, and most preferably 7% by weight or more relative to the amount of the mixed slurry composed of an inorganic powder, an organic binder, a plasticizer, a solvent and the like. For the purpose of making it easy to reduce voids after degreasing, an upper limit value of the content of the organic binder is preferably not more than 50% by weight, more preferably not more than 40% by weight, and most preferably not more than 30% by weight relative to the amount of the mixed slurry.

(Solvent)

The solvent may be used for the purpose of uniformly dispersing the lithium ion conductive inorganic material powder. As the solvent, though known materials such as PVA, IPA or butanol can be used, alcohols and water are preferable from the environmental standpoint. Furthermore, in order to obtain a uniform and minute solid electrolyte, it is possible to add an appropriate amount of a dispersant together with the lithium ion conductive inorganic material powder and the organic binder. In order to improve defoaming at the time of mixing and drying, it is also possible to add an appropriate amount of a surfactant.

(Others)

Also, it is possible to simultaneously contain an Li-containing inorganic compound in the green sheet. The Li-containing inorganic compound works as a sintering assistant (binder) and has an action to bind the glass ceramic particles.

Examples of the Li-containing inorganic compound include $Li_3PO_4$, $LiPO_3$, LiI, LiN, $Li_2O$, $Li_2O_2$ and LiF. In particular, such an Li-containing inorganic compound can be softened or melted by regulating the sintering temperature or atmosphere during mixing with the lithium ion conductive inorganic material powder and sintering the mixture. The softened or melted Li-containing inorganic compound flows into gaps of the lithium ion conductive inorganic material powder, thereby making it possible to firmly bind the inorganic material powder.

When a small amount of an insulating crystal or glass with high dielectricity is added as the inorganic material powder to the green sheet, diffusibility of the lithium ion rises so that an effect for enhancing the lithium ion conductivity is obtainable. Examples thereof include $BaTiO_3$, $SrTiO_3$, $Nb_2O_5$ and $LaTiO_3$.

(Forming of Green Sheet)

The green sheet is formed in a sheet form by employing a known method such a doctor blade method or a calendaring method. For the purpose of making the amount of the residual solvent in the inside in the drying step small as far as possible, thereby generating no crack on the surface, an upper limit value of the thickness of the green sheet after forming is preferably not more than 200 μm, more preferably not more than 150 μm, and most preferably not more than 100 μm. Also, for the purpose of brining about stable handling properties, a lower limit value of the thickness of the green sheet is preferably 0.1 μm or more, more preferably 0.5 μm or more, and most preferably 1 μm or more. Furthermore, the green sheet may be processed into an arbitrary shape, if desired. In order to make the solid electrolyte after firing have a desired thickness, the green sheet may be stacked. Also, in order to more enhance the minuteness of the solid electrolyte after firing, the green sheet may be pressurized by roll pressing, uniaxial or isotropic pressurization or the like.

For the purpose of shortening the firing time, an upper limit value of the thickness of the green sheet after stacking is preferably not more than 800 μm, more preferably not more than 600 μm, and most preferably not more than 400 μm. Also, for the purpose of reducing a degree of undulation, a lower limit value of the thickness of the green sheet is preferably 0.5 μm or more, more preferably 1 μm or more, and most preferably 5 μm or more.

(Firing)

The thus formed green sheet is subsequently subjected to a step of firing (firing step). As described previously, in the invention, in the firing step of the green sheet, at least one surface of the green sheet is covered by a setter having a porosity of not more than 10% by volume. The baking step includes a degreasing step and a sintering step. The degreasing step as referred to herein is a step in which the green sheet is treated at a high temperature, thereby gasifying components other than the inorganic material constituting the green sheet, such as an organic binder and discharging them from the green sheet. The sintering step as referred to herein is a step in which the green sheet is treated at a higher temperature than that in the degreasing step, thereby firing for solidification the inorganic material particles constituting the green sheet. In all of the degreasing step and the sintering step, in order to keep the atmosphere within a furnace constant, it is preferable to achieve evacuation while introducing air.

The firing step may be carried out by using a known firing furnace such as a gas furnace or a microwave furnace. However, it is preferable to use an electric furnace from the standpoints of environment, temperature distribution within a furnace and costs.

In the degreasing step, since it is necessary to combust and decompose the binder, a lower limit of the treatment temperature (degreasing temperature) is preferably 300° C. or higher, more preferably 320° C. or higher, and most preferably 340° C. or higher. When the temperature is rapidly raised, there may be the case where the binder is rapidly combusted and decomposed, thereby deforming the green sheet. Therefore, an upper limit of the degreasing temperature is preferably not higher than 700° C., more preferably not higher than 680° C., and most preferably not higher than 660° C.

In the sintering step, the higher the treatment temperature (sintering temperature), the more minute the green sheet, and following this, the ionic conductivity becomes high. Therefore, a lower limit thereof is preferably 750° C. or higher, more preferably 800° C. or higher, and most preferably 850° C. or higher. However, when the sintering temperature is too high, the crystal having high ionic conductivity is decomposed. Therefore, an upper limit thereof is preferably not higher than 1,250° C., more preferably not higher than 1,200° C., and most preferably not higher than 1,150° C.

The solid electrolyte of the invention is hereunder described. The solid electrolyte of the invention has a porosity of not more than 5% by volume and a maximum through-pore size in a thickness direction of not more than 8 μm and can be obtained by the foregoing production method.

For the purposes of making the moisture permeation small and safely applying to a lithium metal-air primary battery or the like, an upper limit of the porosity of the solid electrolyte of the invention is preferably not more than 5% by volume, more preferably not more than 3% by volume, and most preferably not more than 1% by volume. It is preferable that the porosity is small and close to 0 by volume as far as possible. The present inventor has found that when the porosity falls within the range of not more than the foregoing upper limit value, the solid electrolyte can be safely applied to a lithium metal-air primary battery.

For the purpose of making it easy to make the moisture permeation smaller, the maximum through-pore size in a thickness direction of the solid electrolyte of the invention is preferably not more than 8 μm, more preferably not more than 4 μm, and most preferably not more than 1 μm. For the purpose of making it easy to make the moisture permeation smaller, the average through-pore size of the solid electrolyte of the invention is preferably not more than 5 μm, more preferably not more than 1 μm, and most preferably not more than 0.5 μm.

It is preferable that both of the foregoing maximum through-pore size and average through-pore size are small and close to 0 μm as far as possible. The present inventor has found that when each of the maximum through-pore size and the average through-pore size falls within the range of not more than the foregoing upper limit value, the solid electrolyte can be safely applied to a lithium metal-air primary battery.

For the purpose of making it easy to obtain a lithium primary battery or a lithium ion secondary battery having high capacity and high output, the lithium ion conductivity of the solid electrolyte of the invention is preferably $1\times10^{-4}$ Scm$^{-1}$ or more, more preferably $3\times10^{-4}$ Scm$^{-1}$ or more, and most preferably $5\times10^{-4}$ Scm$^{-1}$ or more.

For the purpose of making it easy to obtain high lithium ion conductivity, it is preferable that the solid electrolyte of the invention contains a crystal of $Li_{1+x+z}M_x(Ge_{1-y}Ti_y)_{2-x}Si_zP_{3-z}O_{12}$ wherein $0 \leq x \leq 0.8$, $0 \leq y \leq 1.0$, $0 \leq z \leq 0.6$, and M is one or more member selected from Al and Ga. Also, from the standpoints of chemical durability and resistance to ignition, it is more preferable that the solid electrolyte of the invention is constituted of only the lithium ion conductive inorganic material.

In the case where the solid electrolyte of the invention is used as a battery, when a migration distance of the lithium ion is short, a battery with high output is obtainable. Therefore, an upper limit value of the thickness of the solid electrolyte of the invention is preferably not more than 300 μm, more preferably not more than 200 μm, and most preferably not more than 150 μm. Also, for the purpose of making handling of the solid electrolyte of the invention simple and easy, a lower limit value of the thickness of the solid electrolyte of the invention is preferably 1 μm or more, more preferably 3 μm or more, and most preferably 5 μm or more.

In the solid electrolyte of the invention, since the shape formed by the green sheet is obtained as it is, processing into an arbitrary shape is easy. Accordingly, it is possible to produce a solid electrolyte having an arbitrary shape. By interposing the solid electrolyte of the invention, disposing a positive electrode and a negative electrode on the both sides thereof and packaging them, a wholly solid lithium primary battery or a lithium ion secondary battery can be obtained.

Also, since the solid electrolyte of the invention is minute and uniform, processing such as cutting or grinding is easy, and its surface can be polished depending upon an application for use. In particular, in the case where a thin electrode or the like is installed on the surface of the solid electrolyte, a good contact interface is obtainable by grinding or polishing the surface.

Also, since the solid electrolyte after firing does not contain an organic material or contains a very small amount of an organic material, it is excellent in heat resistance and chemical durability, and it is less harmful against the safety or environment.

For the positive electrode material of the lithium primary battery according to the invention, it is possible to use a transition metal compound capable of occluding lithium therein or a carbon material. For example, a transition metal oxide containing at least one member selected among manganese, cobalt, nickel, vanadium, niobium, molybdenum and titanium, graphite, carbon and the like are useful.

Also, for the negative electrode material of this lithium primary battery, metallic lithium, an alloy capable of releasing lithium, for example, a lithium-aluminum alloy, a lithium-indium alloy, etc. and the like are useful.

As an active material to be used for the positive electrode material of the lithium ion secondary battery according to the invention, a transition metal compound capable of occluding or releasing lithium can be used. For example, a transition metal oxide containing at least one member selected among manganese, cobalt, nickel, vanadium, niobium, molybdenum and titanium and the like are useful.

Also, in this lithium ion secondary battery, as an active material to be used for its negative electrode material, it is preferable to use metallic lithium, an alloy capable of occluding or releasing lithium, for example, a lithium-aluminum alloy, a lithium-indium alloy, etc., a transition metal oxide of titanium, vanadium, etc. and a carbon based material, for example, graphite, etc.

It is more preferable to use the same ionic conductive inorganic material powder to be contained in the solid electrolyte for the positive electrode and the negative electrode because ionic conduction is imparted. When these are identical, since the migration mechanism of the ion to be contained in the electrolyte and the electrode materials is unified, the ionic migration between the electrolyte and the electrode can be smoothly achieved, and a battery having higher output and higher capacity can be provided.

EXAMPLES

The solid electrolyte, the method for producing a solid electrolyte and the lithium ion secondary battery and the lithium primary battery using the same according to the invention are specifically described below with reference to the following Examples. However, it should not be construed that the invention is limited to those shown in the following Examples, and the invention can be properly modified and carried out within the scope where the gist of the invention is not deviated.

Example 1

$H_3PO_4$, $Al(PO_3)_3$, $Li_2CO_3$, $SiO_2$ and $TiO_2$ were used as raw materials, weighed so as to have a composition of 32.5% of $P_2O_5$, 8.0% of $Al_2O_3$, 15.0% of $Li_2O$, 41.0% of $TiO_2$ and 3.5% of $SiO_2$ in terms of % by mole on the oxide basis and uniformly mixed; and the mixture was then charged in a platinum pot and heated for melting for 3 hours in an electric furnace at 1,450° C. while stirring a glass melt. Thereafter, the glass melt was dropped in running water to obtain flaky glass. This glass was heat treated for crystallization at 970° C. for 15 hours, thereby obtaining a desired glass ceramic. As a result of powder X-ray diffraction, it was confirmed that a main crystal phase of the deposited crystal phase was desired $Li_{1+x+z}Al_xTi_{2-x}Si_2P_{3-z}O_{12}$ (wherein $0 \leq x \leq 0.4$ and $0 \leq z \leq 0.6$). The obtained flake was pulverized by a jet mill to obtain a glass ceramic particle having an average particle size of 5 μm and a maximum particle size of 20 μm. Furthermore, the obtained glass ceramic particle was treated for 48 hours in a wet ball mill using ethanol, and the obtained slurry was dried by spray drying to obtain a glass ceramic fine particle having an average particle size of 0.4 μm and a maximum particle size of 5 μm. To this glass ceramic fine particle and an acrylic resin dispersed in water, a dispersant was added, followed by dispersing and mixing to prepare a slurry. At that time, the amounts of the glass ceramic fine particle and the acrylic resin to be contained in the slurry were regulated at 55.5% by weight and 12.5% by weight, respectively. The thus obtained slurry was formed in a thickness of 150 μm by a doctor blade method and dried at 85° C. to obtain a green sheet. This green sheet was cut out into a size of 100 mm in square and interposed by a zirconia setter having a maximum through-pore size of not more than 0.2 μm, a porosity of 3% and a thickness of 1 mm; and the assembly was degreased at 600° C. and sintered at 1,020° C. in an electric furnace to obtain a solid electrolyte. At that time, the solid electrolyte had a thickness of 110 μm and an ionic conductivity of $2.4 \times 10^{-4}$ $Scm^{-1}$. Also, the solid electrolyte had a maximum through-pore size of 6 μm, an average through-pore size of 1.5 μm and a porosity of 5% by volume.

Comparative Example 1

The same green sheet as in Example 1 was degreased at 600° C. and sintered at 1,020° C. in an electric furnace without interposing by a setter or the like. It was confirmed by an X-ray diffraction method that the main crystal phase was identical to that in Example 1. The obtained solid electrolyte had an ionic conductivity of $1.8 \times 10^{-4}$ $Scm^{-1}$. Also, the solid electrolyte had a maximum through-pore size of 18 μm, an average through-pore size of 6 μm and a porosity of 7% by volume.

Example 2

The glass flake as obtained in Example 1 was pulverized using a jet mill and a wet ball mill with ethanol without being heated treated, and its slurry was further dried by spray drying to obtain a glass fine particle having an average particle size of 0.3 μm and a maximum particle size of 4 μm. To this glass fine particle and an acrylic resin dispersed in water, a dispersant was added, followed by dispersing and mixing to prepare a slurry. At that time, the amounts of the glass ceramic fine particle and the acrylic resin to be contained in the slurry were regulated at 63.5% by weight and 18.5% by weight, respectively. The thus obtained slurry was formed in a thickness of 100 μm by a doctor blade method and dried at 85° C. to obtain a green sheet. This green sheet was cut out into a size of 100 mm in square and interposed by a zirconia setter having a maximum through-pore size of not more than 0.2 μm, a porosity of 3% and a thickness of 1 mm; and the assembly was degreased at 600° C. and sintered at 1,020° C. in an electric furnace. According to this heat treatment, the glass was crystallized, thereby obtaining a sheet-shaped solid electrolyte having $Li_{1+x+z}Al_xTi_{2-x}Si_2P_{3-z}O_{12}$ (wherein $0 \leq x \leq 0.4$, $y=0$, and $0 < z \leq 0.6$) in a main crystal phase and having a thickness of 85 μm. On that occasion, confirmation of the crystal phase was carried out by an X-ray diffraction method. The solid electrolyte had an ionic conductivity of $2.1 \times 10^{-4}$ $Scm^{-1}$, a maximum through-pore size of 5 μm and an average through-pore size of 8 μm. Also, the porosity determined from a true density and a bulk density was 3% by volume. As compared with Example 1, though the ionic conductivity was slightly lowered, the solid electrolyte which is minute and small in both the maximum through-pore size and the average through-pore size was obtained.

(Measurement of Moisture Permeation)

A 20-cc glass-made sample bottle was charged with 1,000 mg of dried LiTFSI as a moisture absorbent and covered by the sheet-shaped solid electrolyte having an area of 3.14 $cm^2$ as obtained in each of Examples 1 and 2 and Comparative Example 1; and a gap thereof was sealed with an epoxy based adhesive, thereby preparing a moisture permeable sample cell for evaluation. This sample cell was weighed and then put in a thermostat at a temperature of 60° C. and a humidity of 90% RH. After keeping for 24 hours, the sample cell for evaluation was again weighed. A difference in weight before and after the testing is corresponding to an amount of moisture permeating through the sample and absorbed by LiTFSI, and this value was divided by the area of the solid electrolyte. The thus obtained value was defined as a moisture permeation. A unit of the moisture permeation is $g/m^2 \cdot 24H$ (60° C.×90% RH). The obtained moisture permeation is shown in Table 1.

TABLE 1

| | Moisture permeation ($g/m^2 \cdot 24$ H (60° C. × 90% RH)) |
|---|---|
| Example 1 | 4.2 mg |
| Example 2 | 1.2 mg |
| Comparative Example 1 | 32.3 mg |

In the light of the above, by covering by the setter having a porosity of not more than 10% by volume and sintering the green sheet, the solid electrolyte which is small in moisture permeation and good in ionic conductivity was obtained. Also, the thus obtained solid electrolyte can be used as an electrolyte for a lithium primary battery or a lithium ion secondary battery. The battery using this solid electrolyte is high in battery capacity, and a battery which can be used stably over a long period of time can be realized.

What is claimed is:

1. A method for producing a solid electrolyte comprising the steps of:
    preparing a green sheet containing a lithium ion conductive inorganic material powder; and
    firing the green sheet,
    wherein in the step of firing the green sheet, at least one surface of the green sheet is covered by a setter having a porosity of not more than 3% by volume, and
    a maximum through-pore size of not more than 6 μm.

2. The method for producing a solid electrolyte according to claim 1, wherein the setter is any one of glass, a glass ceramic or a ceramic.

3. The method for producing a solid electrolyte according to claim 1, wherein the step of firing a green sheet includes a degreasing step and a sintering step, and a sintering temperature in the sintering step is from 750 to 1,250° C.

4. The method for producing a solid electrolyte according to claim 1, wherein the step of baking the green sheet includes a degreasing step, and a degreasing temperature in the degreasing step is from 300 to 700° C.

5. The method for producing a solid electrolyte according to claim 1, wherein the step of preparing the green sheet includes a step of mixing a lithium ion conductive inorganic material powder and an organic binder.

6. The method for producing a solid electrolyte according to claim 5, wherein in the step of mixing a lithium ion conductive inorganic material powder and an organic binder, the content of the lithium ion conductive inorganic material powder is 50% by weight or more.

7. The method for producing a solid electrolyte according to claim 5, wherein in the step of mixing a lithium ion conductive inorganic material powder and an organic binder, the lithium ion conductive inorganic material powder has an average particle size of not more than 5 μm.

8. The method for producing a solid electrolyte according to claim 1, wherein the lithium ion conductive inorganic material powder contains a crystal of $Li_{1+x+z}M_x(Ge_{1-y}Ti_y)_{2-x}Si_zP_{3-z}O_{12}$, wherein $0 \leq x \leq 0.8$, $0 \leq y \leq 1.0$, $0 \leq z \leq 0.6$, and M is one or more member selected from Al and Ga.

9. The method for producing a solid electrolyte according to claim 1, wherein the lithium ion conductive inorganic material powder contains respective components of from 10 to 25% of $Li_2O$ and from 0.5 to 15% of $Al_2O_3$ and/or $Ga_2O_3$ and from 25 to 50% of $TiO_2$ and/or $GeO_2$ and from 0 to 15% of $SiO_2$ and from 26 to 40% of $P_2O_5$ in terms of % by mole on the oxide basis.

10. The method for producing a solid electrolyte according to claim 1, wherein the lithium ion conductive inorganic material powder is glass or a glass ceramic.

* * * * *